United States Patent
Podvin

(10) Patent No.: US 10,775,746 B2
(45) Date of Patent: Sep. 15, 2020

(54) SAFETY VALVE FOR WATCHES

(71) Applicant: OMEGA SA, Biel/Bienne (CH)

(72) Inventor: Pierre Podvin, Morges (CH)

(73) Assignee: OMEGA SA, Biel/Bienne (CH)

( * ) Notice: Subject to any disclaimer, the term of this patent is extended or adjusted under 35 U.S.C. 154(b) by 197 days.

(21) Appl. No.: 16/001,986

(22) Filed: Jun. 7, 2018

(65) Prior Publication Data
US 2019/0025762 A1 Jan. 24, 2019

(30) Foreign Application Priority Data

Jul. 20, 2017 (EP) ..................................... 17182433

(51) Int. Cl.
*G04B 37/08* (2006.01)
*G04B 37/02* (2006.01)
*G04B 37/10* (2006.01)
*F16K 17/02* (2006.01)

(52) U.S. Cl.
CPC ............ *G04B 37/088* (2013.01); *F16K 17/02* (2013.01); *G04B 37/02* (2013.01); *G04B 37/10* (2013.01)

(58) Field of Classification Search
CPC ...... G04B 37/088; G04B 37/02; G04B 37/10; G04B 37/103; G04B 37/106; F16K 17/02
USPC ......... 368/291, 289–290, 288, 308, 319–321
See application file for complete search history.

(56) References Cited

U.S. PATENT DOCUMENTS

| | | | | |
|---|---|---|---|---|
| 4,292,682 A | * | 9/1981 | Wenger | G04B 37/106 368/289 |
| 5,257,247 A | * | 10/1993 | Miche | G04B 37/103 368/290 |
| 5,610,878 A | | 3/1997 | Pretat et al. | |
| 6,137,750 A | * | 10/2000 | Rieben | G04B 37/103 368/290 |

(Continued)

FOREIGN PATENT DOCUMENTS

| | | |
|---|---|---|
| EP | 0 718 211 A1 | 6/1996 |
| EP | 1 610 192 A1 | 12/2005 |
| FR | 2 045 830 | 3/1971 |

OTHER PUBLICATIONS

European Search Report dated Feb. 6, 2018 in European Application 17182433.7 filed on Jul. 20, 2017 (with English Translation of Categories of Cited Documents).

*Primary Examiner* — Edwin A. Leon
(74) *Attorney, Agent, or Firm* — Oblon, McClelland, Maier & Neustadt, L.L.P.

(57) ABSTRACT

An automatic safety valve for timepieces includes a valve head housed inside a tube. The valve head includes a lip seal disposed around a core and arranged so that a lip is squeezed against a wall of an outlet channel to disengage from the area to allow pressure compensation between the interior and exterior of a case during excess pressure inside the case, and pressed against the area to seal the interior of the case during excess pressure outside the case. The safety valve further includes an additional sealing element inside the outlet channel. The additional sealing element includes a membrane that is permeable to gases and to establish fluid communication from the interior of the case towards the exterior, when the internal pressure exceeds a predetermined value, and impermeable to liquids flowing from outside the case towards the interior of the case.

11 Claims, 4 Drawing Sheets

(56) References Cited

U.S. PATENT DOCUMENTS

| | | | |
|---|---|---|---|
| 6,200,020 B1 * | 3/2001 | Rieben | G04B 37/10 |
| | | | 368/290 |
| 9,123,483 B2 * | 9/2015 | Ferri | H01H 13/06 |
| 10,152,024 B2 * | 12/2018 | Baebler | G04B 3/041 |

* cited by examiner

SAFETY VALVE FOR WATCHES

This application claims priority from European Patent Application No. 17182433.7 filed on Jul. 20, 2017, the entire disclosure of which is hereby incorporated herein by reference.

FIELD OF THE INVENTION

The present invention relates to a safety valve for a timepiece, particularly a wristwatch, and more specifically for a wristwatch intended for underwater diving. The present invention also relates to the timepiece provided with said valve.

BACKGROUND OF THE INVENTION

Helium escape valves are present in some dive watches for evacuating helium that has penetrated the watch case during saturation dives where divers inhale a gas mixture containing helium and oxygen. This allows them to stay inside a diving bell or underwater habitat for several days. During this time period, helium may penetrate the watch. In the absence of such a valve, the excess internal pressure caused by helium that has seeped in may, during the decompression phase, cause damage to the watch, such as, for example, loss of the crystal which may pop out or break.

There are manual and automatic helium escape valves. Manual valves operate simply by tightening a sealing element, such as a head, onto the case middle, in the same manner as a screw-in crown. Manual valves have the drawback that the watch is not water-resistant if the valve is not tightened up again. Automatic valves are activated automatically, as their name indicates, when the difference in pressure between the inside of the watch case and the external environment reaches a critical threshold.

A first type of automatic valve is one that the user cannot block, the principles of which are described in Swiss Patent No CH491246. This valve, which, in most cases, is mounted flush with the case middle, takes the form of a simple valve limiting the pressure inside the watch case.

The drawback of this type of valve is that it opens automatically with no possibility of stopping gas escaping and therefore of fluid entering the watch, which is problematic when decompression is performed in a humid environment.

SUMMARY OF THE INVENTION

It is therefore an object of the present invention to propose an automatic valve that ensures proper evacuation of gases that could cause excess pressure inside the watch case while remaining perfectly water-resistant regardless of the conditions in which decompression is performed.

To this end, the present invention proposes an automatic safety valve for timepieces, particularly for dive watches, the valve including a valve head housed inside a tube intended to be fixed inside a case of the timepiece, the valve head including an outlet channel arranged to be capable of fluid communication with the inside of the case via a passage provided in said tube, when the pressure inside the case exceeds the pressure outside the case in order to evacuate excess fluid, said valve head including a central core fixedly mounted inside said outlet channel, a lip seal having an annular base region and lip, the lip seal being disposed around said core and arranged so that the lip is pressed against an area of a wall of the outlet channel, in order, on one hand, to be able to disengage from said area to allow pressure compensation between the interior of the case and the exterior of the case in the event of excess pressure inside the case, and on the other hand, pressed against said area to ensure the sealing of the interior of the case with respect to the exterior in the event of excess pressure outside the case, the safety valve further including an additional sealing element arranged inside the outlet channel between the lip seal and the interior of the case, said additional sealing element including a membrane arranged to be permeable to gases and to establish fluid communication from the interior of the case towards the exterior, when said internal pressure exceeds a predetermined value, and impermeable to liquids flowing from outside the case towards the interior of the case.

As a result of these features, there is obtained a safety valve that ensures efficient sealing regardless of its conditions of use. Further, the absence of moving parts in the valve makes it possible to obtain a valve that operates reliably and is also economical to manufacture and easy to assemble.

Other advantages will appear from the features set out in the claims, from the detailed description of the invention illustrated hereinafter with reference to the annexed drawings, provided as non-limiting examples.

DETAILED DESCRIPTION OF THE INVENTION

Figure 1:
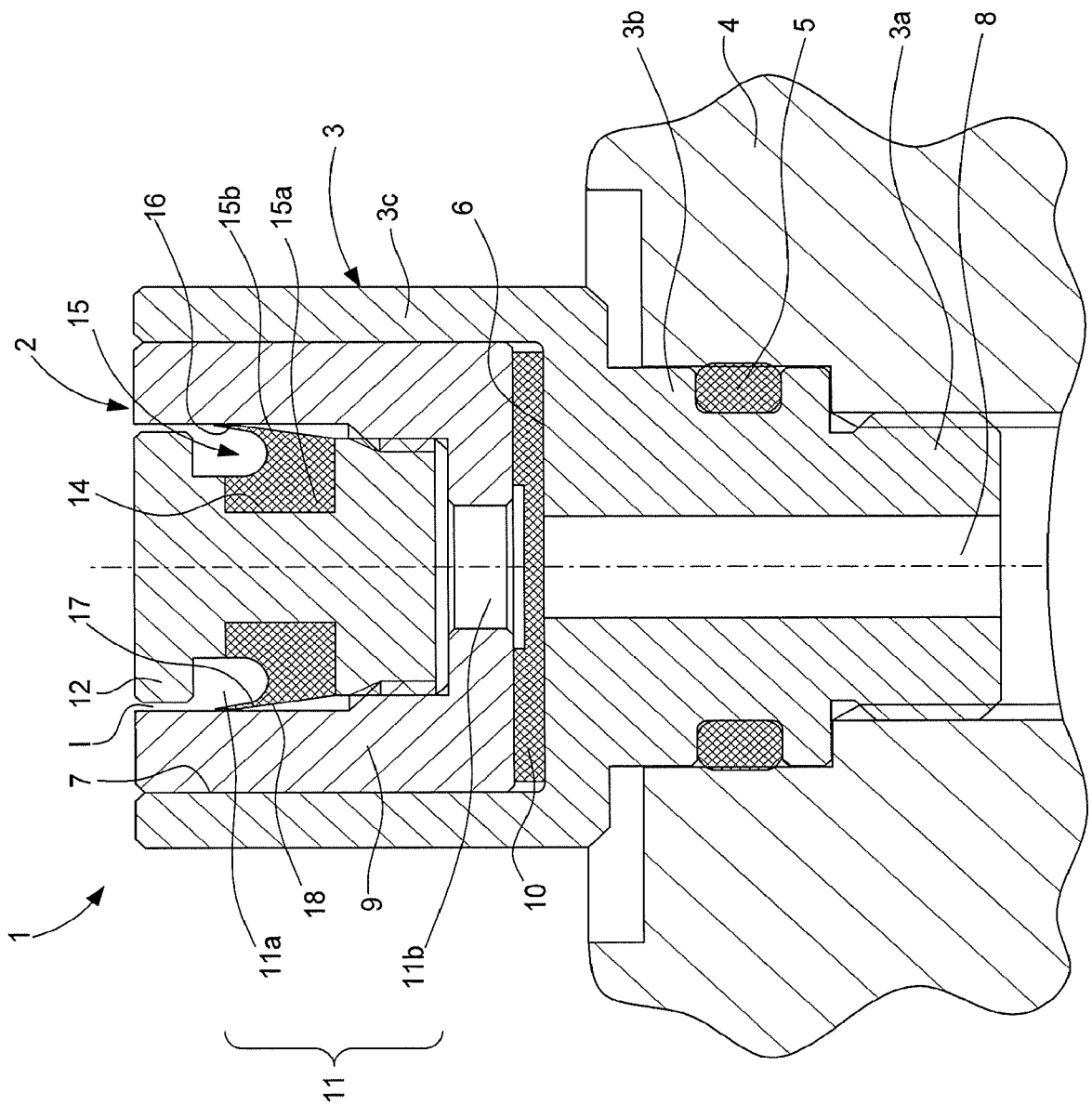
FIG. 1 is a cross-sectional view of an automatic safety valve according to the invention screwed onto the middle part of a watch case.

The present invention relates to a helium escape valve, which will also be referred to as a safety valve, for a timepiece and especially for a dive watch. This valve is designated by the general reference 1 in the drawings.

The automatic safety valve 1 represented in FIGS. 1 to 4 includes a valve head 2 and a tube 3 integral with valve head 2. Tube 3 is screwed, via its lower part 3*a*, into a middle part 4 of a case (partially represented). In its median portion, the tube has a bulge 3*b* provided with a groove which houses an O-ring joint 5 sealing the tube as regards case middle 4. In the illustrated example, tube 3 ends in a top portion 3*c* protruding from case middle 4. Tube 3 has an inner shoulder 6 delimiting a first upper space 7, inside which is housed valve head 2, and a second lower space defining a passage 8, connected to the interior of the case.

It is evident that, in a variant embodiment, tube 3 can be embedded in case middle 4.

The valve head has a body 9 of generally cylindrical shape, which is driven into upper space 7 of tube 3 and clamps a membrane 10 against inner shoulder 6.

The valve head includes a central outlet channel 11 provided in body 9 and arranged to be capable of fluid communication with the interior of the watch case via membrane 10 and passage 8 of tube 3, when the pressure inside the case exceeds the pressure outside the case in order to evacuate excess fluid.

To achieve this, membrane 10 is arranged to be permeable to gases and to establish fluid communication from the interior of the case to the exterior when the pressure inside the case exceeds a predetermined value, and impermeable to liquids flowing from outside the case towards the interior of the case.

Outlet channel 11 includes a first section 11a opening outside the case and a second section 11b of smaller diameter, arranged opposite passage 8. A central core 12 is screwed into first section 11a of outlet channel 11 via a thread 13, arranged in the lower part of first section 11a, i.e. in the part directed towards the interior of the case.

Central core 12 has a generally cylindrical shape and includes, in its median part, a peripheral recess in the bottom of which is arranged a groove 14 receiving a lip seal 15, which includes an annular base region 15a and sealing lip 15b. Sealing lip 15b is squeezed against an area 16 of the inner wall of first section 11a of outlet channel 11 to ensure the sealing of the case interior with respect to the exterior in the event of excess pressure outside the case. On the other hand, sealing lip 15b is configured to bend in an essentially perpendicular direction to disengage from area 16 to allow pressure compensation between the interior of the case and the exterior of the case, in the event of excess pressure inside the case, by evacuating fluid through the valve.

Membrane 10, which is arranged inside outlet channel 11 between lip seal 15 and the interior of the case, thus forms an additional sealing element. The membrane is composed of a polymer film that is impermeable to water and permeable to gases. Typically, the polymer film is carried by a gas porous substrate. Advantageously, this membrane may be a membrane sold by GORE® under the reference "Acoustic vent GAW331".

Figure 2:
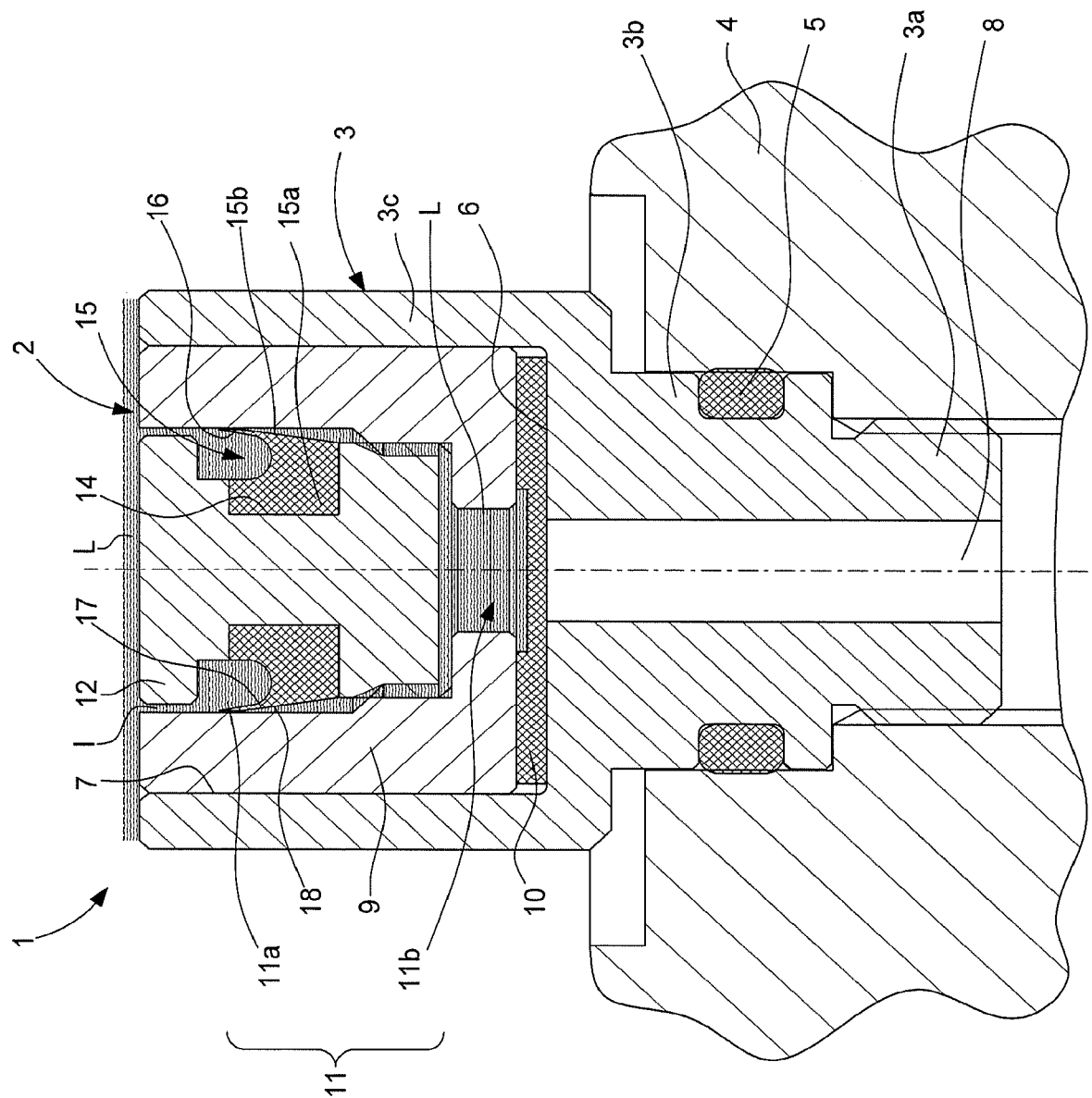
FIG. 2 is a similar cross-sectional view to FIG. 1, in a configuration wherein the valve is subjected to low external pressure, which is higher than the pressure inside the watch case and wherein the progression of fluid in the valve is represented schematically.
Figure 3:
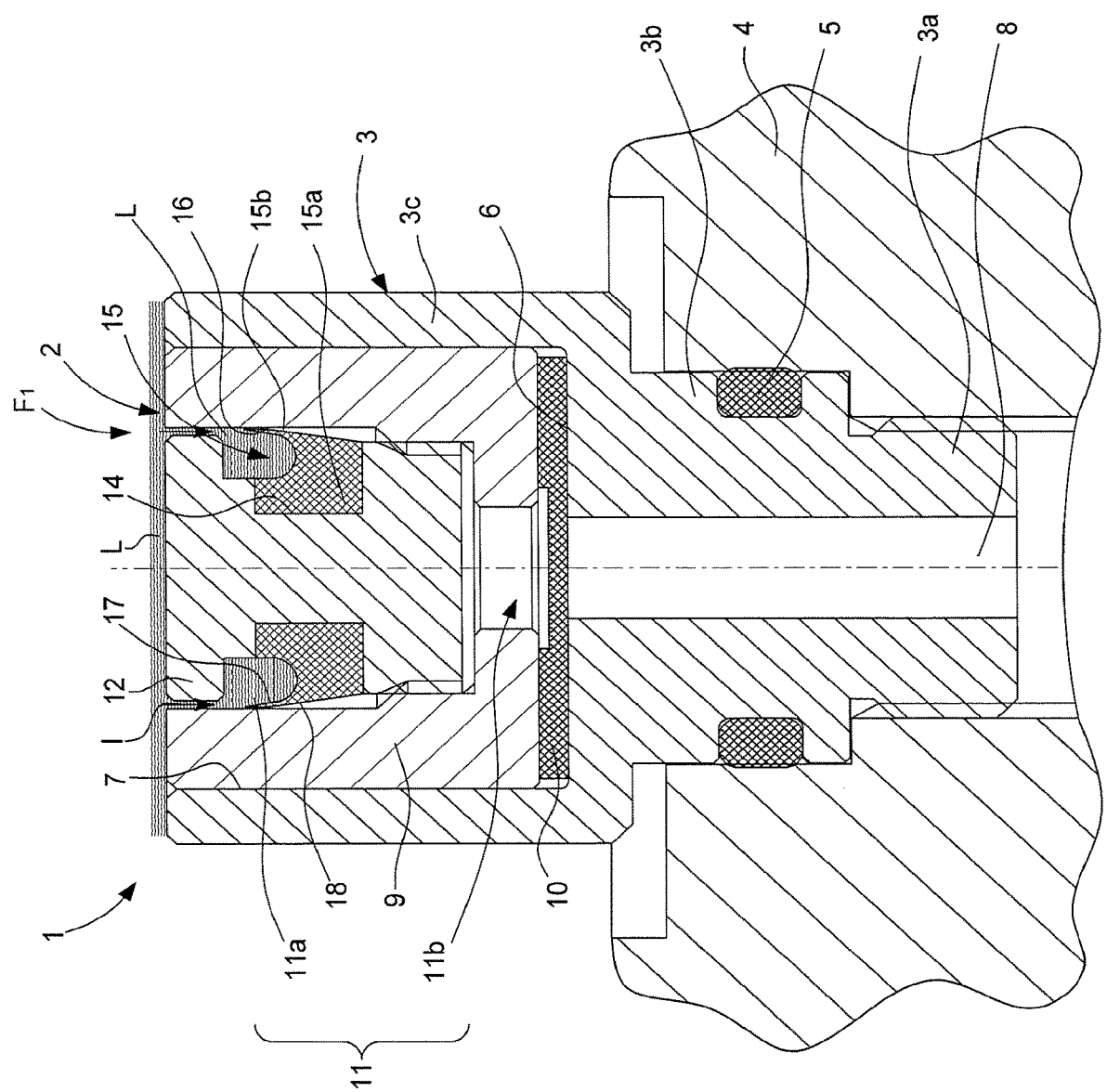
FIG. 3 is a similar cross-sectional view to FIG. 1, in a configuration wherein the valve is subjected to high external pressure, which is higher than the pressure inside the watch case and wherein the progression of fluid in the valve is represented schematically.
Figure 4:
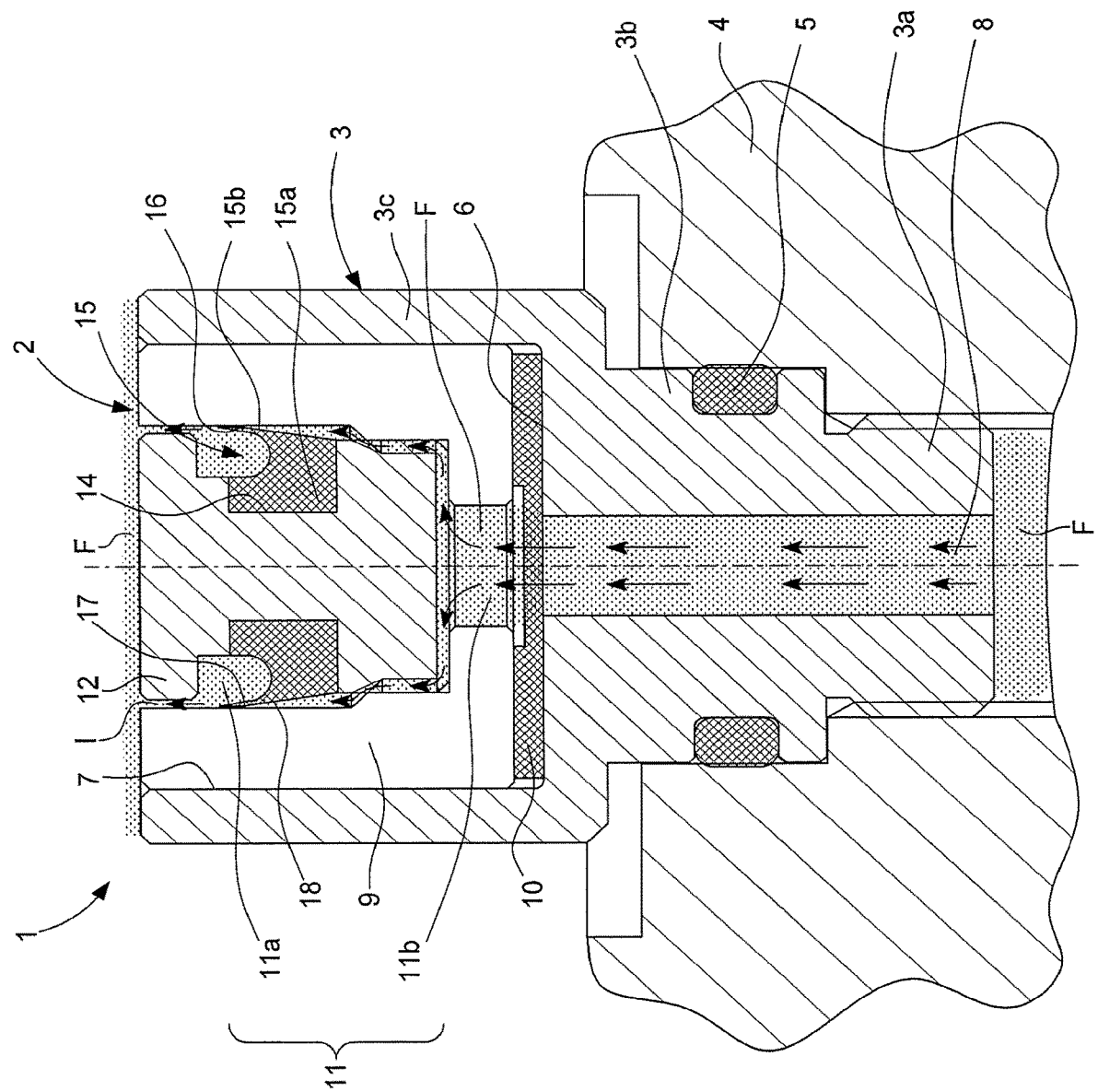
FIG. 4 is a similar cross-sectional view to FIG. 1, in a configuration wherein the pressure inside the case is higher than the pressure outside the watch case and wherein the progression of fluid in the valve is represented schematically.

FIGS. 2 to 4 illustrate the operation of the automatic valve according to the invention.

When the valve is immersed in a liquid medium and is subjected to low pressure, there is a risk that liquid L will enter the gap I between the external wall of core 12 and internal wall of first section 11a of outlet channel 11. As the pressure of the liquid exerted on upper surface 17 of the lip is low in these conditions, there is a risk that part of the liquid will seep between the lip and its bearing area 16 and continue through the threaded part of first section 11a of the outlet channel and reach second section 1b of the latter. Owing to the presence of the additional sealing element formed by membrane 10, the liquid is stopped and sealing of the case is ensured (FIG. 2).

When the valve is immersed in a liquid medium and is subjected to high pressure, the risk of liquid L being able to enter the gap between the external wall of core 12 and internal wall of first section 11a of outlet channel 11 exists, but the pressure exerted by liquid L on lip 15 is significant and presses the latter firmly against bearing area 16, so that the sealing of the case is reliably ensured by seal 15 (FIG. 3).

In the presence of excess pressure inside the case, fluid F, in this case helium gas, comes into contact with membrane 10, which is permeable to gases, which allows fluid F to pass through the membrane, flow into second section 11b of outlet channel 11 and pass through the threaded part of first section 11a. Consequently, fluid F presses against lower face 18 of lip 15b and moves the latter away from bearing area 16, thereby allowing fluid to escape through the gap between the external wall of core 12 and internal wall of first section 11a of outlet channel 11. The excess pressure fluid inside the case can thus escape from the case to balance the pressure inside and outside the case without compromising the water-resistance of the case.

It will also be noted that, according to alternative embodiment that is not represented, tube 3 can be surmounted by a cap screwed onto the protruding portion of tube 3, this cap being able to act as a device for activating or deactivating the value.

What is claimed is:

1. An automatic safety valve for timepieces, the valve comprising:
   a valve head housed inside a tube intended to be fixed inside a case of the timepiece, the valve head including an outlet channel arranged to be capable of fluid communication with the inside of the case via a passage provided in said tube, when the pressure inside the case exceeds the pressure outside the case in order to evacuate excess fluid, said valve head including a central core fixedly mounted inside said outlet channel, a lip seal having an annular base region and a lip, the lip seal being disposed around said core and arranged so that the lip is pressed against an area of a wall of the outlet channel, in order to be able to disengage from said area to allow pressure compensation between the interior of the case and the exterior of the case in the event of excess pressure inside the case, and so that the lip is pressed against said area to ensure the sealing of the interior of the case with respect to the exterior in the event of excess pressure outside the case,
   the safety valve further including an additional sealing element arranged inside the outlet channel between the lip seal and the interior of the case, said additional sealing element including a membrane arranged to be permeable to gases and to establish fluid communication from the interior of the case towards the exterior, when said internal pressure exceeds a predetermined value, and impermeable to liquids flowing from outside the case towards the interior of the case.

2. The valve according to claim 1, wherein the tube has an inner shoulder and in that said membrane is clamped between the valve head and said shoulder.

3. The valve according to claim 1, wherein the membrane is composed of a polymer film that is impermeable to water and permeable to gases.

4. The valve according to claim 3, wherein the polymer film is carried by a porous substrate.

5. The valve according to claim 1, wherein the outlet channel includes a first section opening outside the case extended by a second section of smaller diameter than the first section arranged facing the passage in the tube.

6. The valve according to claim 1, wherein a lower part of the first section of the outlet channel includes a thread and in that the core is screwed onto said thread.

7. The valve according to claim 1, wherein the core has a generally cylindrical shape including, in its median part, a groove receiving the base of said lip seal.

8. The valve according to claim 1, wherein the valve head is driven into the tube.

9. The valve according to claim 1, wherein the tube is screwed onto the case.

10. A timepiece comprising the valve according to claim 1.

11. The timepiece according to claim 10, wherein the timepiece is a dive watch.

\* \* \* \* \*